United States Patent [19]

Comeau

[11] Patent Number: 4,471,275

[45] Date of Patent: Sep. 11, 1984

[54] MOTOR DRIVEN DRAPERY CLOSURE AND CONTROL CIRCUIT COMBINATION

[75] Inventor: Paul E. Comeau, Warwick, R.I.

[73] Assignee: Kenney Manufacturing Company, Warwick, R.I.

[21] Appl. No.: 453,761

[22] Filed: Dec. 27, 1982

[51] Int. Cl.³ ............................................. H02P 3/08
[52] U.S. Cl. .................................. 318/286; 318/469; 318/474; 318/480
[58] Field of Search ............... 318/469, 474, 282, 480, 318/286

[56] References Cited

U.S. PATENT DOCUMENTS 3,243,680  3/1966  Burns ................................... 318/293
3,891,909  6/1975  Newson .......................... 318/282 X
4,394,607  7/1983  Lemirande ..................... 318/469 X Primary Examiner—G. Z. Rubinson
Assistant Examiner—Bentsy Ro
Attorney, Agent, or Firm—Robert B. Russell

[57] ABSTRACT

A motor driven drapery closure is provided with means for operating the closure between defined opened and closed positions without the use of limit switches. Means are also provided to stop the operation of the motor and back it up slightly if a significant resistance is met by the closure at a point midway of its travel or as a result of coming to the designed end of its travel. Additional means are provided for operating the closure in response to means for sensing an outside ambient condition such as the level of infrared light.

4 Claims, 1 Drawing Figure

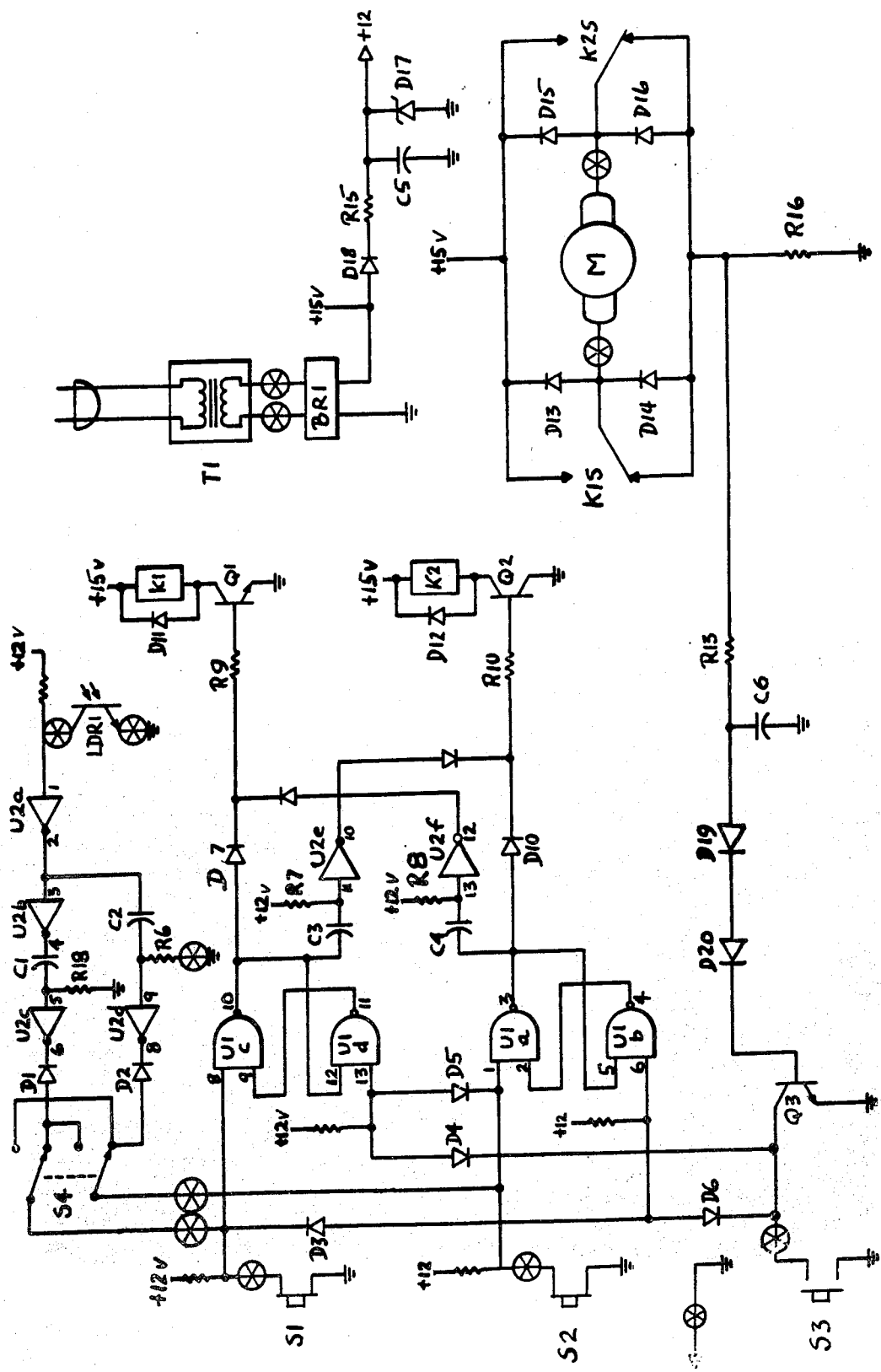

MOTOR DRIVEN DRAPERY CLOSURE AND CONTROL CIRCUIT COMBINATION

FIELD OF THE INVENTION

The present invention relates to motor driven drapery closures and more particularly to motor drive means for opening and closing or raising and lowering a curtain, shade, blind, or the like. Specifically, the invention relates to the combination of the closure means and the control circuitry for the motor which operates it.

BACKGROUND OF THE INVENTION

Motor-driven drapery closures, such as motor-driven traverse rods, have been in use for many years. They are, however, expensive both in terms of initial cost, and in terms of installation. They also are relatively large. As a result, electric traverse rods, as they are sometimes called, are used mainly in commercial installations such as in showrooms or in very expensive homes, and they are installed only by professionals. Hitherto, they have not been sold successfully in the consumer, do-it-yourself, market. One reason for the high cost of such electric traverse rods is that large drive motors have had to be used to handle the forces involved. In addition, the controls have required numerous parts including position sensing limit switches, and the like. Such limit switches have to be installed in the correct position for each installation, and the complexity of placing them with sufficient accuracy has made it virtually impossible to sell such equipment to the ordinary consumer. In one prior art electric traverse rod, a limit switch is employed which senses tension in the draw cord of the curtain and stops the motor. Such an arrangement avoids the problem of the accurate placement of position sensing limit switches, but it has the drawback of leaving the draw cords under tension, and of leaving the top of the curtain in a bunched condition when fully opened.

Accordingly, it is a basic object of this invention to provide an extremely simple, small, inexpensive, safe and easily installed, drive motor and control combination for drapery closures such as electric traverse rods, and the like. Still another object is to provide such a combination without the use of limit switches, and which will stop and back up slightly either at a point midway of their travel if an obstacle is encountered or at the desired end of their travel.

Additional objects include the provision of means for automatically actuating the motor in response to a gradually changing outside condition sensed such as the level of outside ambient light.

BRIEF DESCRIPTION OF THE INVENTION

In the accomplishment of these and other objects, of the invention, in an illustrative embodiment, an electric motor is provided, together with mechanical coupling to drive the master carriers of a drapery traverse rod, or the like. The direction of drive of the motor is reversible and controls are provided to drive it in either direction by operation of separate manually operated switches. A further manually operated "stop" switch is provided. In use, once the motor starts in one direction, it will continue in that direction until either the stop switch is actuated or the master carrier of the travers rod comes up against a significant resistance as by coming to the closed or open positions or by the curtain meeting an obstacle, snag, or the like. Such a resistance causes the motor to draw increased current and this change is detected and employed to operate an internal control which stops the motor. Additionally, whenever the motor is stopped either by operation of the stop switch or by the drapery meeting a resistance, provision is made for backing up the motor a small amount to relieve any tension or compression in the closure or its mechanical coupling which may have resulted from the resistance.

The primary features of the invention are that the drive and its controls are small, simple, safe and inexpensive. In addition, no limit switches are required, the length of the traverse rod (height of door, etc.) is irrelevant, and if a snag is encountered midway of the travel, no harm results. Installation requires no expertise, and the operation is safe because of the brief back-up feature which operates whenever the motor stops.

DESCRIPTION OF THE DRAWINGS

The single FIGURE is a schematic logic and component diagram of the control circuit and motor combination of the invention.

DETAILED DESCRIPTION OF THE INVENTION

The preferred embodiment of the invention comprises a closure and motor combination which may be a motor driven traverse rod as described in my co-pending application Ser. No. 376,203 filed May 5, 1982. The closure motor and mechanical coupling shown in that application adequately illustrate a suitable mechanical arrangement. Other suitable drapery closures and the coupling thereof to motors are known in the art and need not be described. This description, therefore, focuses attention on the motor and its control circuitry. With reference to the drawing, the circuit of the invention comprises a motor M which, as shown, is a permanent magnet D.C. motor the direction of drive of which can be reversed depending on the direction of current supplied to it. The motor shown in the FIGURE is a very small, high r.p.m. (9000 r.p.m.), 15 volt D.C. motor employing a very high gear ratio to develop the necessary torque. Such motors are highly reliable, yet inexpensive, and uniquely suited for use in the context of electic traverse rods. Electric current for the motor M is supplied from a conventional 110 volt A.C. source reduced to 15 volts by transformer T1 and rectified to D.C. by full wave bridge rectifier BR1. The "raw" rectified voltage from BR1 is further isolated by diode D18, smoothed by R-C combination R15-C5, and controlled to a regulated 12 volt level by zener diode D17, to provide a transient-free voltage to the C-Mos control components presently to be described.

The 15 volt supply is arranged to be applied to motor M in opposite directions for reversing operation. The motor M drives the master carriers of the drapery by means of a sprocket and tape as described in the copending application.

The control circuit employs conventional C-Mos integrated circuits, transistors, relays and switches as follows. Starting at the left of the diagram, switches S1 and S2 are employed to initiate operations, each switch commanding a given direction of travel of the master carriers. Switches S1 and S2 are single pole, single throw, normally open switches. Closing S1 grounds pin 8 of U1c which, together with U1d forms a flip-flop, and the grounding of pin 8 of U1c accordingly causes pin 10 of U1c to go high. Simultaneously, the closing of S1 causes diode D3 to conduct and this, in turn, causes pin 6 of U1b to go low and pin 4 of U1b to go high.

When pin 10 of U1c is high, it forward-biases the base-emitter junction of transisor Q1 through diode D7 and current limiting resistor R9. This saturates Q1 causing current to flow through the coil of relay K1. Reverse voltage transients which may be induced by current changes are shorted across the coil of K1 by diode D11.

Closing switch S2 performs an identical function with respect to relay D2. Thus, closing S2 simultaneously grounds pin 1 of U1a and pin 13 of U1d. This causes pin 3 of U1a to go high and, via diode D10 and current limiting resistor R10, forward-biases transistor Q2 so as to energize the coil of relay K2, which is likewise protected against transients by diode D12.

Relays K1 and K2 operate switches K1s and K2s, respectively. These switches are double-pole switches arranged so that if K1 alone is energized so as to actuate K1s, current flows from the 15 volt source through K1s, through motor M, through K2s, and through resistor R16 to ground, causing the motor to rotate in one direction. Energizing K2 alone causes the current to flow through K2s, through the motor in the opposite direction, through K1s, and again through R16 to ground causing the motor to rotate in the reverse direction. If K1 and K2 are either energized or de-energized simultaneously, the motor M is shorted and stopped rapidly by dynamic braking action.

The closure of S1 for a sufficient time to allow the initial surge of current through motor M to subside sets U1c so as to continuously energize relay K1, and the circuit remains in that condition until U1c is "flipped" back to the condition in which its pin 10 is low. Likewise, a similar closure of S2 sets U1a so as to energize relay K2 continously until U1a is likewise reset. The resetting of U1c and U1a is done in one of several ways. First, it can be done by operation of a "stop" switch S3 which grounds pin 6 of U1b through diode D6 causing pin 4 of U1b to go high, which in turn causes pin 2 of U1a to go high and since pin 1 of U1a is already high, this drives pin 3 of U1a low causing relay K2 to become de-energized. At the same time, pin 13 of U1d is grounded through diode D4 sending pin 11 high and since pins 8 and 9 of U1c will then both be high, pin 10 of U1c will go low, causing relay K-1 to become de-energized. In this way, when S3 is closed, both relays K1 and K2 will be de-energized and motor M will stop. A second way to reset U1c or U1a is by calling for a different direction of travel by pressing S1 or S2. Thus, if S1 has been previously actuated and the motor M is running in response to the energization of K1, closing S2 will ground pin 13 of U1d causing pin 11 of U1d to go high. This makes pin 9 of U1c high and since pin 8 of U1c is already high, pin 10 will go low causing relay K1 to de-energize, and since K2 will be energized due to the pressing of S2, the motor will start running in the reverse direction. The same, in reverse, happens if S2 has been previously closed and S1 is thereafter closed, the motor will run in one direction and closing the other switch will stop it and start it running in the other direction. If both S1 and S2 are closed simultaneously, both K1 and K2 will be energized, and, as explained above, the motor M will then stop. When this is done, however, when S1 and S2 are thereafter opened, one will open slightly before the other, and the circuit will then respond to the last to remain closed of the two switches.

Still another way for the flip-flops U1c and U1a to be reset is by the drapery support's coming up against an obstacle as by coming to the curtain-closed or curtain-opened positions or by some other form of resistance at an intermediate point of the travel. This causes the motor M to labor and draw more current which, in turn, causes the voltage on the motor side of R16 to rise. This rise in voltage is detected through an R-C combination of R13 and C-6 and two diodes D19 and D20 in series to the base of transistor Q3. When conducting, Q3 serves to ground the line to diodes D4 and D6 in the identical way that the stop switch S3 does. In this way, when either K1 or K2 is separately energized, the motor will run until the drapery support meets an obstacle, at which point, the motor starts to draw more current up to a point and then, by operation of Q3, immediately shuts off. The important thing to note is that this is accomplished without limit switches. The voltage at which this shut-off feature takes place is regulated by the threshold values of D19, D20 and Q3. One or more can be used as desired. A zener diode can also be used, but using simple diodes, as described, is less expensive.

It should also be noted that the energization of the relays K1 or K2 so as to start the motor causes a brief surge of current through R16 which, in turn, briefly causes Q3 to conduct likewise briefly. This would cause the motor to stop but for the fact that S1 or S2 will normally be held down long enough for the current surge to subside, say ½ second.

It also should be noted that transients at the inputs of U1a, U1b, U1c, and U1d may accompany the closure of any of switches S1 to S4 and that such transients can falsely trigger the flip-flop action. In order to protect against this, if it becomes a problem an R-C combination similar to that described above for R13 and C6 can be placed on the input side of pins 1, 6, 8 and 13 of U1 to filer out the transient as is well known to those skilled in the art.

In the context of drapery closures, it is usually desirable that the drapery remain firmly opened or closed and not be able gradually to creep to a slightly opened or closed position due, for example, to the action of air currents. For this purpose it is desirable to use a direct current motor with high gear reduction, and with the armature shorted to provide dynamic braking. Such motors remain in a relatively fixed position once they come to a stop. When such motors are used, however, and they are brought to a stop by means as described whereby sensing a rise in current due to the closure encountering a resistance is used to initiate the stopping action, the curtain will be left in a constrained condition unless measures are taken to relieve same. This is done by auxilliary circuitry associated with the flip-flops U1a, U1b, U1c, U1d. When either S3 is closed or Q3 starts conducting at a time when, for example, K1 is energized, pin 10 of U1c goes low. This causes pin 11 of U2e to go low for a short period determined by the values of C3 and R7. With pin 11 of U2e low, pin 10 of U2e goes high and activates Q2 through current limiting resistor R10. In this way, K2 will be energized for a short period causing the motor to rotate in the reverse direction for that same short period. Similarly, if K2 is operating and either S3 is closed or Q3 conducts, a short low pulse, the duration of which is determined by C4 and R8 is applied to pin 13 of U2f which causes pin 12 of U2f to go high thereby activating Q1 and energizing K1 for a brief period of reverse motor action. By these measures, the drapery support automatically comes to rest at the desired location without the use of limit switches and without any residual tension or compression in the drapery. If an obstacle or snag is met midway in the travel, the closure will stop without tearing the curtain, and will back off a small distance. Normally, the back-travel of the motor with the curtain in the closed position will be very small, that is, only enough to relieve the tension in the cords but not enough to open up a crack between the two halves of the curtain. In the opened position, however, a back-up of several inches may be desired to allow the drapes to hang straight without bunching up at the top. The amount of back-up is controlled by the values of C3 and R7, and C4 and R8, respectively, any one or more of which can be variable. Normally, however, in the interest of economy, fixed resistors and capacitors will be selected for traverse rods of specific lengths.

Provision is also made to operate the control circuit in response to a sensed condition such as the level of ambient outside infrared light. For this purpose a cadmium selenide photocell LDR1 is employed. When light, from the outside, within the spectral response range of LDR1, strikes it, pin 1 of U2a is brought low causing pin 2 of Schmitt trigger U2a to go high. This causes a momentary high pulse on pin 9 and low pulse on pin 8 of U2d, the duration of which is determined by C2 and R6. Conversely, when light is removed from LDR1, pin 2 of U2a goes low. This causes pin 3 of U2b to go low and pin 4 of U2b to go high transmitting a momentary high pulse to pin 5 of U2c, the duration of which is determined by C7 and R18. This causes a momentary low pulse to appear at pin 6 of U2c. The negative going pulses at pin 8 of U2d and pin 6 of U2c are connected to either S1 or S2 or neither, by means of a double-pole, double-throw, center-open switch S4. Thus, the circuit may be employed to close or open a drape in response to either the absence or presence of light, or may be returned to the manual mode employing S1 and S2.

This feature of the invention is important in the context of energy conservation and comfort regulation whereby a curtain may be closed for purposes of comfort during the heat of the day in summer, but opened during daytime in winter for energy conservation.

It should be noted also that the time constants selected for the negative going pulses at pins 6 and 8 of U2c and U2d, respectively, are approximately 1 second. This is to ensure that the relays K1 and K2 will remain energized long enough to permit the start-up surge of current through motor M to subside.

In addition, it should be noted that the Schmitt trigger U2a prevents oscillation of the system during a slow transition from dark to light or vice versa. Thus, the Schmitt trigger U2a will be actuated only when the voltage at its pin 1 drops below a specific low voltage of say 4 volts, and will not be actuated again until the voltage at pin 1 has risen again to a high voltage of at least about 8 volts. Such a spread in voltage will not be encountered in any variations of lightness or darkness in any normal twilight or dawn transition period, and, therefore, the system is, as a practical matter immune from oscillation during transition periods.

Having thus described a preferred embodiment of my invention, it will now be apparent to those skilled in the art that various modifications can be made while still remaining within the spirit of the invention. It is, therefore, not my intention to confine the invention to the precise form herein shown and described but to limit it only in terms of the appended claims.

I claim:

1. A motor driven drapery closure and control combination comprising:
    (a) a drapery closure;
    (b) a reversing electric motor for driving (a) between a closed and an opened position;
    (c) means for coupling (b) to (a);
    (d) means for supplying current to (b) optionally to close or open (a);
    (e) means for sensing the amount of current being supplied by (d);
    (f) means responsive to (e) for interrupting the the operation of (d) at a predetermined level of said current;
    (g) the motor of (b) being a D.C. motor with a high gear reduction ratio and the armature of which is arranged for dynamic braking when not energized, and
    (h) means responsive to (f) for reversing the operation of (b) for a short time predetermined period of time; whereby tensions or compressions in (c) after the operation of (d) has been interrupted, are relieved.

2. The closure and control combination defined in claim 1 further characterized by:
    (i) the means (h) for reversing the operation of (b) arranged to provide a different period of reverse operation depending upon the direction of travel of the closure.

3. The closure and control combination defined in claim 2 further characterized by:
    (j) the duration of the period of (i) at the end of operation in the opening direction being substantially longer than in the closing direction.

4. A motor driven drapery closure and control combination comprising:
    (a) a drapery closure;
    (b) a reversing electric motor for driving (a) between a closed and an opened position;
    (c) means for coupling (b) to (a);
    (d) means for supplying current to (b) optionally to close or open (a);
    (e) means for sensing the amount of current being supplied by (d);
    (f) means responsive to (e) for interrupting the operation of (d) at a predetermined level of said current;
    (g) means for sensing an ambient condition;
    (h) means responsive to (g) for actuating (d);
    (i) means for preventing a subsequent operation of (h) until a major reversal in the ambient condition has occurred; and
    (j) the means (i) comprising a Schmitt trigger which, after once transmitting a signal in response to one voltage, requires a major change in voltage in the opposite sense before being capable of again transmitting a signal signifying the sensing of the element condition.

* * * * *